US000001795H

United States Statutory Invention Registration [19]

[11] Reg. Number: H1,795

Leek [45] Published: Jul. 6, 1999

[54] GUSSET ANGLE CORNER CONNECTION

[75] Inventor: William F. Leek, Anaheim, Calif.

[73] Assignee: Simpson Strong-Tie Company, Inc., Pleasanton, Calif.

[21] Appl. No.: 08/963,568

[22] Filed: Oct. 31, 1997

[51] Int. Cl.[6] ..... E04B 1/38

[52] U.S. Cl. ..... 52/712

[58] Field of Search ..... 52/712, 713, 702, 52/703, 698, 699; 403/231, 231.1, 233, 403, 400

[56] References Cited

U.S. PATENT DOCUMENTS

| | | | |
|---|---|---|---|
| 471,610 | 3/1892 | Hart . | |
| 2,863,352 | 12/1958 | Mikesic . | |
| 3,466,071 | 9/1969 | Reed . | |
| 3,854,268 | 12/1974 | Gutner . | |
| 4,014,618 | 3/1977 | Kristiansen . | |
| 4,032,242 | 6/1977 | Morris . | |
| 4,560,301 | 12/1985 | Gilb | 52/702 X |
| 4,589,792 | 5/1986 | Niziol . | |
| 4,973,187 | 11/1990 | Sauder . | |
| 5,150,982 | 9/1992 | Gilb | 52/712 X |
| 5,160,211 | 11/1992 | Gilb . | |
| 5,577,695 | 11/1996 | Ruckwardt . | |

FOREIGN PATENT DOCUMENTS

| | | | |
|---|---|---|---|
| 2132073 | 7/1984 | Germany | 52/712 |

OTHER PUBLICATIONS

Simpson Strong–Tie Company, Inc. Catalog C–97, Wood Construction Connectors, Framing Anchors, p. 58.

Simpson Strong–Tie Company, Inc. Catalog C–97, Wood Construction Connectors, Reinforcing and Skewable Angles, p. 51.

Simpson Strong–Tie Company, Inc. Catalog C–97, Wood Construction Connectors, A Angles, p. 59.

Donald E. Breyer, Design of Wood Structures, Third Edition 1993, Clips, pp. 708, 709, 711, 712 and 731.

*Primary Examiner*—Charles T. Jordan
*Assistant Examiner*—Meena Chelliah
*Attorney, Agent, or Firm*—James R. Cypher

[57] ABSTRACT

A structural connection wherein two structural members are joined at an angle of less than 180 degrees by a sheet metal connector, formed with an integral gusset at the longitudinal line of juncture, that is attached with a plurality of fasteners. The gusset reinforces the connection against forces acting perpendicular to the longitudinal line of juncture and the plurality of fasteners reinforce the connection against angular displacement of the structural members perpendicular to the longitudinal line of juncture.

3 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUSSET ANGLE CORNER CONNECTION

BACKGROUND OF THE INVENTION

This invention relates to a structural connection including a sheet metal connector joining two structural members.

The angle connectors known in the art are formed from substantially rectangular sheet metal blanks, often with a plurality of indentations along two parallel sides in order to allow a staggered nail pattern, bent along a longitudinal line of juncture. Such connectors resist vertical loads when joining horizontal structural members and horizontal loads when joining vertical structural members, but are not designed to resist angular displacement of the structural members perpendicular to the longitudinal line of juncture of the connector.

The present invention teaches a connection between two structural members, wherein the connector not only resists vertical or horizontal loads, depending on the orientation of the structural members, but also resists angular displacement.

SUMMARY OF THE INVENTION

The connection of the present invention overcomes the limitations of the prior art by incorporating a gusset in the angle connector.

An object of the present invention is to provide a corner connection that resists angular displacement of the structural members perpendicular to the longitudinal line of juncture of the connector.

A further object of the present invention is to provide a corner connection wherein headed fasteners securely join the connector to the structural members.

A further object of the present invention is to provide a corner connection that resists rotational displacement of the structural members about single fasteners.

A further object of the present invention is to provide a corner connection wherein the connector resists bending at the longitudinal line of juncture.

A further object of the present invention is to provide a corner connection wherein the connector is easily and inexpensively manufactured and installed.

DESCRIPTION OF THE PREFERRED EMBODIMENTS OF THE PRESENT INVENTION

Figure 1:
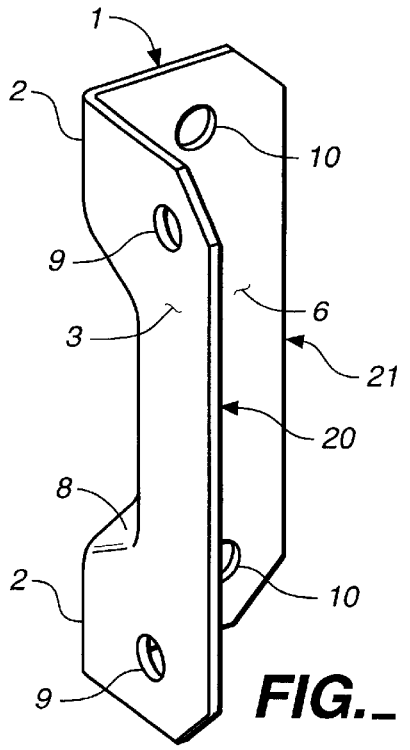
FIG. 1 is a perspective view of the preferred embodiment of the gusset angle of the present invention.
Figure 8:
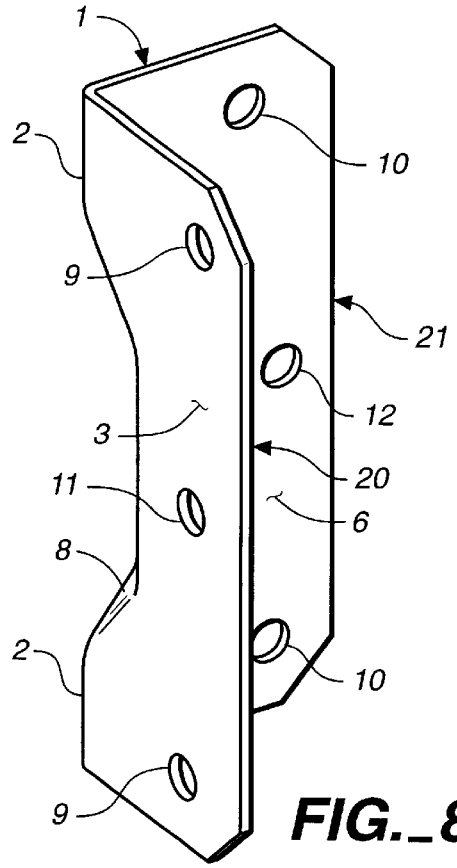
FIG. 8 is a perspective view an alternate preferred embodiment of the gusset angle of the present invention.
Figure 7:
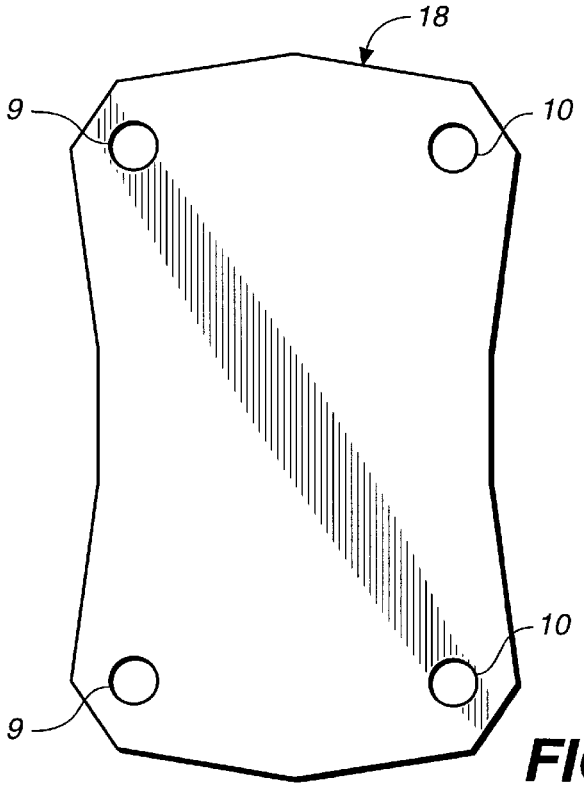
FIG. 7 is a front elevation view of the sheet metal blank of the preferred embodiment of the gusset angle of the present invention.
Figure 2:
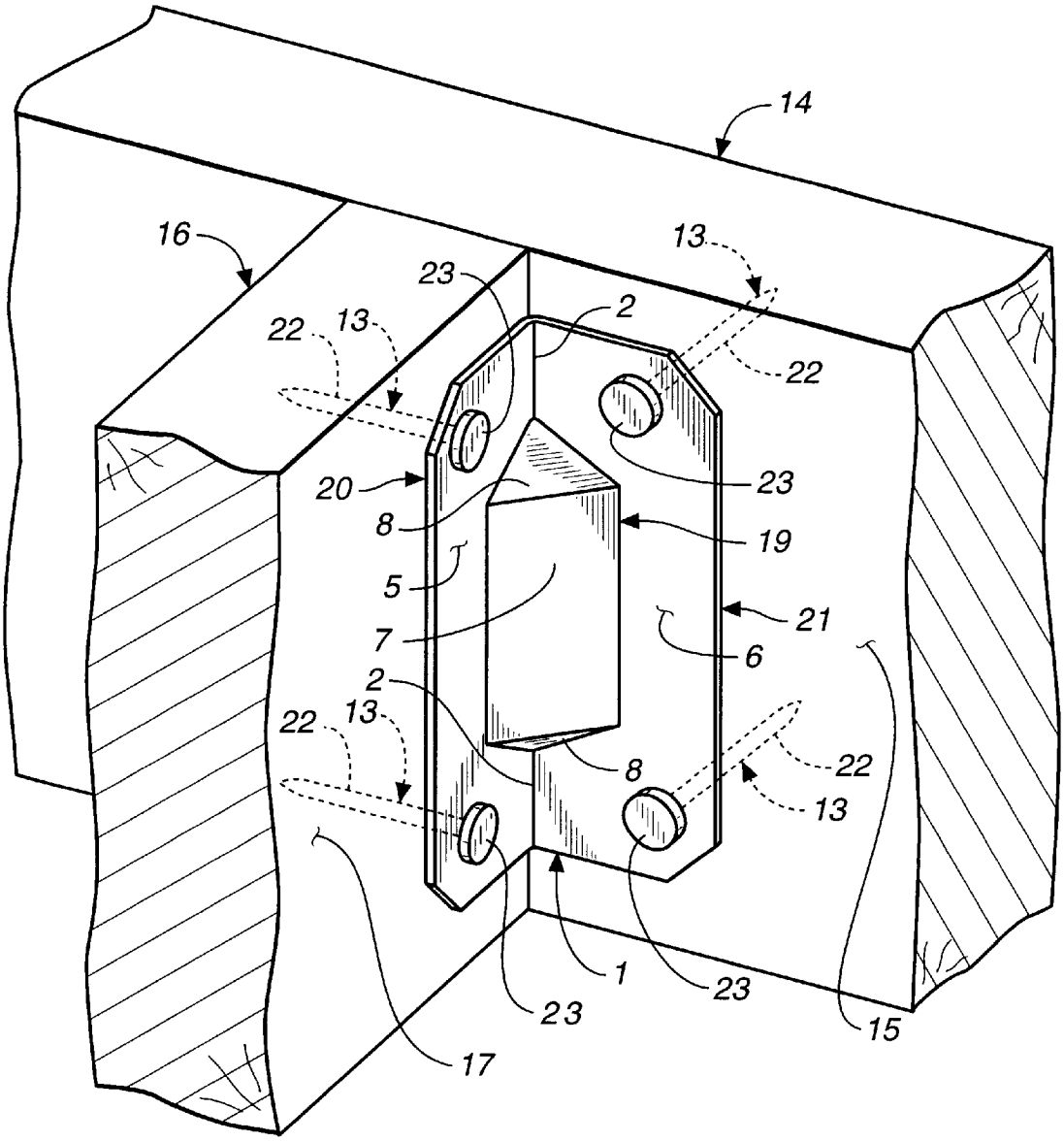
FIG. 2 is a perspective view of the preferred embodiment of the present invention.
Figure 3:
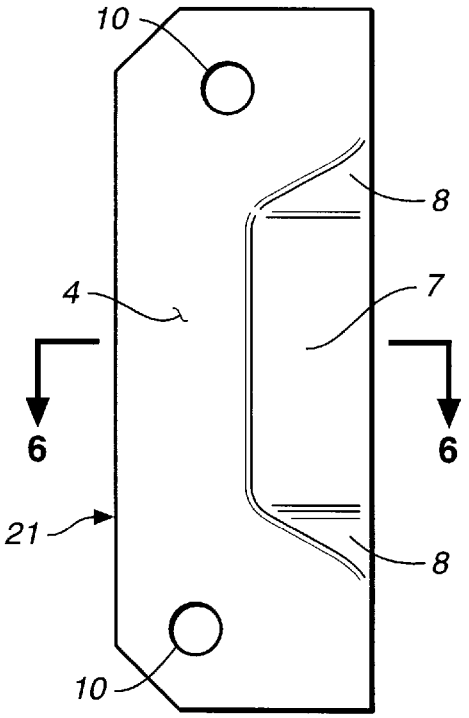
FIG. 3 is a side elevation view of the preferred embodiment of the gusset angle of the present invention.
Figure 4:
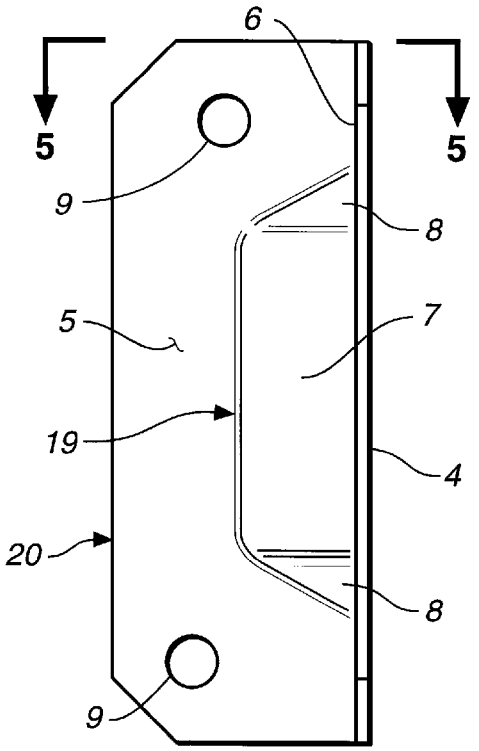
FIG. 4 is another side elevation view of the preferred embodiment of the gusset angle of the present invention.
Figure 6:
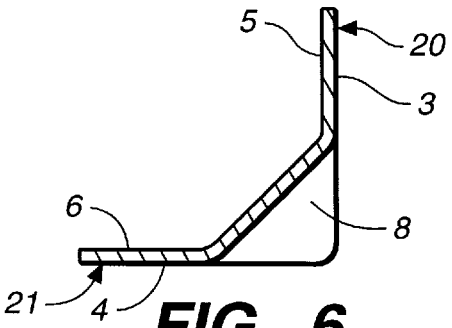
FIG. 6 is a cross sectional view of the preferred embodiment of the gusset angle of the present invention taken generally along line 6—6.
Figure 5:
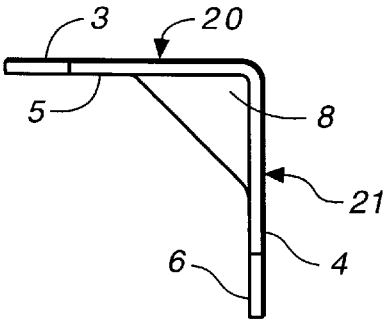
FIG. 5 is a top plan view of the preferred embodiment of the gusset angle of the present invention taken generally along line 5—5.

The gusset angle 1 of the present invention is preferably formed from a sheet metal blank 18, as shown in FIG. 8, bent along a longitudinal line of juncture 2, into which a gusset 19 with a rectangular planar section 7 and two triangular planar sections 8 is embossed. The longitudinal line of juncture 2 divides the gusset angle 1 into a first laterally-disposed portion 20, with an outer surface 3 and an inner surface 5, and a second laterally-disposed portion 21, with an outer surface 4 and an inner surface 6. In the preferred form, the inner surfaces 5 and 6 define an included angle of approximately ninety degrees. The outer surface 3 of the first laterally-disposed portion 20 is held in registration with the inner surface 17 of a first structural member 16 by a plurality of fasteners 13, and the outersurface 4 of the second laterally-disposed portion 21 is held in close registration with the inner surface 15 of a second structural member 14 by a plurality of fasteners 13. In the preferred form, the fasteners 13 are 10*d* nails. Fasteners 13 pass through the fastener openings 9 in the first laterally-disposed portion 20 into the first structural member 14. Fasteners 13 pass through the fastener openings 10 in the second laterally-disposed portion 21 into the second structural member 16. The shank portions 22 of the fasteners 13 are substantially enclosed within the structural members 14 and 16 and the head portions 23 of the fasteners 13 rest against inner surfaces 5 and 6 of the first and second laterally-disposed portions 20 and 21. In the preferred form, the gusset angle 1 has two fastener openings 9 in the first laterally-disposed portion 20 and two fastener openings 1O in the second laterally-disposed portion 21, in order to resist rotational displacement of the structural members 14 and 16 in the planes of the laterally-disposed portions 20 and 21. In the preferred form of the invention, the fastener openings 9 and 10 are spaced no further from the longitudinal line of juncture 2 than twice the lateral dimension of the rectangular planar section 7 of the gusset 19.

In an alternate preferred form of the present invention, shown in FIG. 8, the gusset angle 1 has a third fastener opening 11 between the two fastener openings 9 in the first laterally-disposed portion 20. There is a corresponding third fastener opening 12 between the two fastener openings 10 in the second laterally-disposed portion 21.

I claim:

1. A connection joining a first structural member and a second structural member, together defining an included angle of less than 180°, comprising:

(a) a first structural member;

(b) a second structural member forming a joint with said first structural member;

(c) a connector that is a single plate having first and second laterally-disposed portions defined by a longitudinal line of juncture and defining between their inner surfaces an included angle of less than 180°, the outer surface of said first portion in registration with said first structural member and the outer surface of said second portion in registration with said second structural member;

(d) said plate having a gusset at the longitudinal line of juncture, formed out of parts of said laterally-disposed portions, said gusset having a rectangular planar section longitudinally parallel to said line of juncture and laterally perpendicular to the bisector of said included angle, said rectangular planar section having first and second ends perpendicular to said line of juncture, first and second sides parallel to said line of juncture, and triangular plane sections with bases coincident with said first and second ends and apices at said longitudinal line of juncture; and (e) a plurality of fasteners, composed of shank portions and head portions, that pass through the connector from said included angle into said structural members so that said shank portions are substantially enclosed within said first and second structural members and said head portions rest against said inner surfaces of said first and second laterally-disposed portions.

2. The connection of claim 1, wherein said connector has at least two fastener openings in each of said laterally-disposed portions.

3. The connection of claim 2 in which said fastener openings are spaced a distance from said longitudinal line of juncture no greater than twice the lateral dimension of said rectangular planar section of said gusset.

* * * * *